US007468142B2

(12) United States Patent
Dournel

(10) Patent No.: US 7,468,142 B2
(45) Date of Patent: Dec. 23, 2008

(54) SOLVENT COMPOSITIONS

(75) Inventor: Pierre Dournel, Brussels (BE)

(73) Assignee: Solvay S.A. (BE)

( * ) Notice: Subject to any disclaimer, the term of this patent is extended or adjusted under 35 U.S.C. 154(b) by 730 days.

(21) Appl. No.: 10/416,062

(22) PCT Filed: Nov. 7, 2001

(86) PCT No.: PCT/EP01/12988

§ 371 (c)(1), (2), (4) Date: May 7, 2003

(87) PCT Pub. No.: WO02/38718

PCT Pub. Date: May 16, 2002

(65) Prior Publication Data

US 2004/0013610 A1  Jan. 22, 2004

(30) Foreign Application Priority Data

Nov. 8, 2000 (FR) ................... 00 14514

(51) Int. Cl.
 *A62D 1/08* (2006.01)
(52) U.S. Cl. ................... 252/8; 252/2; 252/67; 424/45; 510/415; 510/461
(58) Field of Classification Search ................ 510/461, 510/415; 252/67, 8, 2; 424/45
See application file for complete search history.

(56) References Cited

U.S. PATENT DOCUMENTS

| 5,210,106 | A | * | 5/1993 | Dams et al. | .................. 521/110 |
| 5,298,083 | A | * | 3/1994 | Van Der Puy et al. | ......... 134/42 |
| 5,376,359 | A | * | 12/1994 | Johnson | ....................... 424/46 |
| 5,696,307 | A | * | 12/1997 | Van Der Puy et al. | ....... 570/134 |
| 5,817,708 | A |   | 10/1998 | Congelio et al. | ............. 524/104 |
| 5,993,682 | A | * | 11/1999 | Tapscott et al. | ................. 252/8 |
| 6,313,083 | B1 | * | 11/2001 | Flynn et al. | .................. 510/411 |
| 6,660,709 | B1 | * | 12/2003 | Dournel et al. | ............. 510/461 |

FOREIGN PATENT DOCUMENTS

| EP | 0676458 | 10/1995 |
| JP | 08 020553 | 1/1996 |

OTHER PUBLICATIONS

Derwent Abstract of AN 1996-124078, XP-002174719 (Chuo Aerosol Kagaku KK).

* cited by examiner

*Primary Examiner*—Peter D. Mulcahy
*Assistant Examiner*—Henry Hu
(74) *Attorney, Agent, or Firm*—Connelly Bove Lodge & Hutz LLP

(57) ABSTRACT

Composition comprising at least one hydrofluoroalkane and at least one fluoropolyether.

4 Claims, No Drawings

SOLVENT COMPOSITIONS

The present invention relates to solvent compositions and their use.

International agreements aiming to protect the stratospheric ozone layer require the reduction or even gradual elimination of the use of chlorofluorocarbons (CFCs) and hydrochlorofluorocarbons (HCFCs). Compounds of this kind are used inter alia as solvents or as refrigerants. For example, CFC-11 (CFC-113) is used as a degreasing solvent or for cleaning surfaces. More recently, HCFC-141b has been used for these applications. The latter compound is also used with surfactants in drying agents. CFC-11 (CFC-11) and HCFC-123 are used, for example, as refrigerants in turbocompressors.

Patent Application JP-A-08/020553 proposes compositions containing an flammable organic compound, a perfluoropolyether and a fluorocarbon such as, in particular, HCFC-141b, these possibly being used as a solvent and as a dispersion agent. These mixtures have a certain flammability.

It was desirable to find non-flammable compositions free of products capable of impairing the stratospheric ozone layer, possibly having advantages as regards their liquid-vapour equilibrium, namely in particular a substantially constant vapour pressure when they are subjected to an evaporation operation. It was also desirable to find compositions suitable for use in processes for manufacturing polymer layers.

The invention therefore relates to a composition comprising at least one hydrofluoroalkane having a boiling point greater than or equal to 10° C. at 101.3 kPa and at least one perfluoropolyether.

It has been found that the composition according to the invention has advantages as regards its liquid-vapour equilibrium while being non-flammable. It has been found that the composition according to the invention can be used advantageously for suspending, dispersing or dissolving materials intended to be deposited in layer form on a surface, particularly fluoropolymers.

For the purposes of the present invention the term "hydrofluoroalkane" is understood to mean a saturated organic compound consisting only of carbon atoms, hydrogen atoms and fluorine atoms. The hydrofluoroalkanes that can be used in the compositions according to the invention may be linear, branched or cyclic and contain, in general, 3, 4, 5, 6, 7, 8, 9 or 10 carbon atoms.

The F/H numerical ratio (the number of fluorine atoms in the molecule divided by the number of hydrogen atoms in the molecule) of the hydrofluoroalkane is generally greater than or equal to 0.5. An F/H numerical ratio greater than or equal to 0.6 is very suitable. Preferably, the F/H numerical ratio is greater than or equal to 1. The F/H numerical ratio is generally less than or equal to 20. Preferably the F/H numerical ratio is less than or equal to 4.

In the compositions according to the invention, the hydrofluoroalkane has a boiling point greater than or equal to about 10° C. at 101.3 kPa. Good results are obtained with a hydrofluoroalkane having a boiling point greater than or equal to about 15° C. at 101.3 kPa. In a preferred embodiment, the hydrofluoroalkane has a boiling point greater than or equal to about 20° C. at 101.3 kPa. The hydrofluoroalkane generally has a boiling point less than or equal to about 200° C. at 101.3 kPa. Good results are obtained with a hydrofluoroalkane having a boiling point less than or equal to about 100° C. at 101.3 kPa.

Typical examples of hydrofluoroalkanes are chosen from hydrofluoropropanes, hydrofluorobutanes and hydrofluoropentanes. Specific examples of such hydrofluoroalkanes are 1,1,1,3,3-pentafluoropropane (HFC-245fa), 1,1,1,3,3-pentafluorobutane (HFC-365mfc) and 1,1,1,2,3,4,4,5,5,5-decafluoropentane (HFC-43-10mee). 1,1,1,3,3-pentafluoropropane and 1,1,1,3,3-pentafluorobutane are preferred. 1,1,1,3,3-pentafluorobutane is most particularly preferred.

For the purposes of the present invention, the term "perfluoropolyether" is intended to mean a compound consisting essentially of carbon, fluorine and oxygen atoms and comprising at least 2, preferably at least 3, C—O—C ether linkages or a mixture of several compounds satisfying this definition. Often the oxygen atoms in the perfluoropolyether are exclusively present within the C—O—C ether linkages.

In the compositions according to the invention, the perfluoropolyether generally has a boiling point greater than or equal to about 40° C. at 101.3 kPa. Good results are obtained with a perfluoropolyether having a boiling point greater than or equal to about 45° C. at 101.3 kPa. The perfluoropolyether generally has a boiling point less than or equal to about 200° C. at 101.3 kPa. Good results are obtained with a perfluoropolyether having a boiling point less than or equal to about 15° C. at 101.3 kPa.

In the compositions according to the invention, the perfluoropolyether generally has a molecular mass greater than or equal to about 200. When the perfluoropolyether is a mixture of several compounds, the molecular mass is the weight-average molecular mass ($\overline{M}_w$) Good results are obtained with a perfluoropolyether having a molecular mass greater than or equal to about 250. The perfluoropolyether generally has a molecular mass less than or equal to about 2000. Good results are obtained with a perfluoropolyether having a molecular mass less than or equal to about 1500.

When the perfluoropolyether is a mixture of compounds, it is preferred to have a mixture whose boiling point is substantially homogeneous. A mixture of this type may consist, for example, of a distillation fraction having a boiling range less than or equal to 8° C., more often less than or equal to 5° C. and preferably less than or equal to 2° C. In this case, the boiling point of the perfluoropolyether indicated above is the arithmetic mean of the two extreme temperatures of the boiling range.

In a particular embodiment, the kinematic viscosity of the perfluoropolyether is less than or equal to 1 cSt (Centistdke) at 25° C. Often the kinematic viscosity of the perfluoropolyether is less than or equal to 0.9 cSt at 25° C. Preferably, the kinematic viscosity of the perfluoropolyether is less than or equal to 0.8 cSt at 25° C. A perfluoropolyether having a kinematic viscosity of less than or equal to 0.6 cSt at 25° C. is more particularly preferred. In the particular embodiment, the kinematic viscosity of the perfluoropolyether is generally at least 0.3 cSt (Centistoke) at 25° C.

Perfluoropolyethers that can be used in the compositions according to the invention are commercially available or can be obtained by known processes (see, for example, Ameduri and Boutevin, Top. Curr. Chem. (1997), Vol. 192, p. 178-179). The perfluoropolyether can be obtained, for example, by a process comprising:
(a) the photooxidation of a fluoroolefin preferably chosen from hexafluoropropylene and tetrafluoroethylene;
(b) a chemical and/or physical treatment of the photooxidation product;
(c) a distillation in order to isolate the desired perfluoropolyether.

The chemical treatment may, for example, be a fluorination. The physical treatment may, for example, be a photolysis or a thermolysis. Perfluoropolyethers that can be used are, for example, those satisfying the general formulae $CF_3$—[(OCF $(CF_3)$—$CF_2)_a$—$(O$—$CF_2)_b]O$—$CF_3$ (I) and $CF_3$—$[(OCF_2$—$CF_2)_c$—$(O$—$CF_2)_d]O$—$CF_3$ (II) in which a, b, c and d independently denote integers greater than 0.

Particular examples of perfluoropolyethers are those marketed by Ausimont under the names GALDEN® and FOMBLIN®. Mention may be made, for example, of the perfluoropolyether GALDEN® HT 55 satisfying the general formula (I) and having a boiling point of about 57° C. at 101.3 kPa and an average molecular mass of about 340 and the perfluoropolyether FOMBLIN® PFS1 having a boiling point of about 90° C. at 101.3 kPa and an average molecular mass of about 460.

A further particularly suitable perfluoropolyether is the perfluoropolyether GALDEN® HT 70 satisfying the general formula (I) and having a boiling point of about 66° C. at 101.3 kPa.

When the compositions according to the invention are subjected to an evaporation operation, their vapour pressure is substantially constant. In general, when the compositions according to the invention are subjected to an evaporation operation, after 50% by weight of the composition has evaporated the vapour pressure of the remaining composition differs from the vapour pressure of the initial composition by less than or equal to 10%. Preferably, this difference is less than or equal to 5%.

In an alternative embodiment it has however been found that when some compositions according to the invention are subjected to an evaporation operation, after 50% by weight of the composition has evaporated, the vapour pressure of the remaining composition differs from the vapour pressure of the initial composition by more than 10%. In this embodiment, it is preferred that the perfluoropolyether is contained in the liquid composition in an effective amount to ensure that the vapour phase above said liquid composition after 50 weight % evaporation remains non-flammable.

In the compositions according to the invention, the weight ratio of the hydrofluoroalkane to the perfluoropolyether is generally greater than or equal to 5:95. Often the weight ratio is greater than or equal to 10:90. Preferably, the ratio is greater than or equal to 25:75. The weight ratio of the hydrofluoroalkane to the petfluoropolyether is generally less than or equal to 95:5. Often the weight ratio is less than or equal to 90:10. Preferably, the ratio is less than or equal to 85:15.

Fundamentally, the thermodynamic state of a fluid is defined by four interdependent variables, namely the pressure (P), the temperature (T), the composition of the liquid phase (X) and the composition of the gas phase (Y). A true azeotrope is one particular system consisting of two or more components for which, at a given temperature and a given pressure, the composition of the liquid phase X is exactly the same as the composition of the gas phase Y. A pseudo-azeotrope is a system consisting of two or more components for which, at a given temperature and a given pressure, X is substantially the same as Y. In practice, this means that the constituents of such azeotropic and pseudo-azeotropic systems cannot be easily separated by distillation and consequently the gas phase is not enriched with the flammable compound.

For the purposes of the present invention, the term "pseudo-azeotropic mixture" is understood to mean a mixture of two constituents whose boiling point (at a given pressure) differs from the boiling point of the true azeotrope by at most 0.5° C. Mixtures whose boiling point differs from the boiling point of the true azeotrope by at most 0.2° C. are preferred. Mixtures whose boiling point differs from the boiling point of the true azeotrope by at most 0.1° C. are particularly preferred.

1,1,1,3,3-pentafluorobutane and the perfluoropolyether GALDEN® HT 55 form a binary azeotrope or pseudo-azeotrope when their mixture contains about 17 to 48% by weight of the perfluoropolyether GALDEN® HT 55. Binary compositions containing from 23 to 42% by weight of the perfluoropolyether GALDEN® HT 55 are preferred. Binary compositions containing about 30 to 40% by weight of the perfluoropolyether GALDEN® HT 55 are particularly preferred. At a pressure of 100.1±0.2 kPa, the binary composition essentially consists of about 64.4% by weight of 1,1,1,3,3-penta-fluorobutane and about 35.6% by weight of the perfluoropolyether GALDEN® HT 55 constitutes a true azeotrope whose boiling point is about 37.8° C. The true azeotrope is non-flammable and has no flash point determined according to the ISO 1523 standard.

1,1,1,3,3-pentafluorobutane and the perfluoropolyether GALDEN® HT 70 form a binary azeotrope or pseudo-azeotrope at atmospheric pressure (about 101.3 kPa) when their mixture contains from 23% to 43% by weight of the perfluoropolyether GALDEN® HT 70. Binary compositions containing from 28% to 38% by weight of the perfluoropolyether GALDEN® HT 70 are preferred. Binary compositions containing about 31% to 35% by weight of the perfluoropolyether GALDEN® HT 70 are particularly preferred. At a pressure of about 101.3 kPa, the binary composition essentially consists of about 67% by weight of 1,1,1,3,3-pentafluorobutane and about 33% by weight of the perfluoropolyether GALDEN® HT 70 constitutes a true azeotrope whose boiling point is about 38° C.

Another composition according to the invention which is non-flammable according to the ISO 1523 standard essentially consists of about 30% by weight of 1,1,1,3,3-pentafluorobutane and about 70% by weight of the perfluoropolyether FOMBLIN® PFS1.

The invention also relates to a composition comprising at least one hydrofluoroalkane having a-boiling point greater than or equal to 10° C. at 101.3 kPa and at least one hydrofluoropolyether having a boiling point greater than or equal to 40° C. at 101.3 kPa.

The hydrofluoroalkanes having a boiling point greater than or equal to 10° C. at 101.3 kPa that can be used in these compositions are the same as those described above within the context of the compositions containing a perfluoropolyether.

For the purposes of the present invention, the term "hydrofluoropolyether" is understood to mean a compound essentially consisting of carbon, fluorine, oxygen and hydrogen atoms, containing at least one C—H linkage and comprising at least two, preferably three, C—O—C ether linkages, or a mixture of several compounds satisfying this definition. Often, the oxygen atoms in the hydrofluoropolyether are exclusively present within the C—O—C ether linkages. In general, the hydrofluoropolyether contains a plurality of C—H linkages. Specific examples of hydrofluoropolyethers contain at least one —$CF_2H$ group. Hydrofluoropolyethers that can be used are, for example, those marketed by Ausimont under the name H-GALDEN®. Hydrofluoropolyethers that can be used may be obtained, for example, by a process like that described above for the manufacture of the perfluoropolyethers, preferably comprising a hydrogenation step. The boiling point of the hydrofluoropolyethers that can be used is greater than or equal to 40° C. at 101.3 kPa. Apart from this fact, the boiling points, boiling point range, viscosity, molecular masses and weight ratios of hydrofluoropolyether in the compositions according to the invention containing a hydrofluoropolyether are the same as those described above in the case of the compositions containing a perfluoropolyether.

Examples of suitable hydrofluoropolyethers include, amongst others, the hydrofluoropolyether H-GALDEN® Grade A having a boiling point at 101.3 kPa of about 56° C. and the hydrofluoropolyether H-GALDEN® Grade B having a boiling point at 101.3 kPa of about 88° C.

The invention also relates to a composition according to the invention furthermore containing a non-fluorinated organic solvent. As the non-fluorinated organic solvent, for example, hydrocarbons, chlorinated hydrocarbons, alcohols, esters, ketones or ethers are very suitable.

In a specific embodiment, the composition according to the invention furthermore contains more than one non-fluorinated organic solvent. A composition according to the invention furthermore containing 1, 2 or 3 non-fluorinated organic solvents is particularly preferred.

The hydrocarbons that can be used in the compositions according to the invention may be linear, branched or cyclic and generally contain 3, 4, 5, 6, 7, 8, 9, 10, 11 or 12 carbon atoms. Hydrocarbons containing at least 5 carbon atoms are very suitable. Preferably, the hydrocarbons contain at least 6 carbon atoms. Among alkanes or alkenes, compounds containing from 5 to 12 carbon atoms are preferred. N-hexane or n-heptane or n-octane are very suitable. Among aromatic hydrocarbons, those containing at least one alkyl substituent on a benzene ring are preferred. Toluene, 1,2-xylene, 1,3-xylene, 1,4-xylene or mixtures thereof are most particularly preferred.

In another preferred embodiment, the hydrocarbon is a paraffinic hydrocarbon fraction which can be obtained by petrochemical refinery of hydrocarbon feedstocks. Such fractions are commercially available, for example from SHELL or EXXON and are often characterised by their flash point. A paraffinic hydrocarbon fraction, which is suitable for use in the compositions according to the invention, has generally a flash point equal to or greater than 40° C., determined according to the standard IP 170 (Abel). Often, the flash point of the paraffinic hydrocarbon fraction is at least 50° C. A paraffinic hydrocarbon fraction having a flash point equal to or greater than 60° C. A paraffinic hydrocarbon fraction having a flash point equal to or greater than 70° C. such as for example SHELLSOL® D70 or SHELLSOL® D90 commercialised by SHELL is more particularly preferred.

The compositions according to the invention containing at least a hydrocarbon, preferably a paraffinic hydrocarbon fraction as described herebefore, are particularly suitable for degreasing applications.

The chlorinated hydrocarbons that can be used in the compositions according to the invention may be linear, branched or cyclic and generally contain 1, 2, 3, 4, 5, 6, 7, 8, 9 or 10 carbon atoms. Chlorinated hydrocarbons containing 1, 2, 3 or 4 carbon atoms are very suitable. Preferably, the chlorinated hydrocarbons contain 1 or 2 carbon atoms. Among chlorinated alkanes, dichloro-methane, trichloromethane and 1,2-dichloroethane are preferred. Among chlorinated alkenes, perchmoroethylene and 1,2-dichloroethylene are preferred, trans-1,2-dichloroethylene being most particularly preferred.

In a particular embodiment the compositions according to the invention comprise 1,1,1,3,3-pentafluorobutane, the perfluoropolyether GALDEN® HT 55 and trans-1,2-dichioroethylene in proportions at which they form an azeotrope or pseudo-azeotrope. 1,1,1,3,3-pentafluorobutane, the perfluoropolyether GALDEN® HT 55 and trans-1,2-dichloroethylene form a ternary azeotrope or pseudo-azeotrope at a pressure of about 101.3 kPa when their mixture contains about from 13 to 53% 1,1,1,3,3-pentafluorobutane, from 31 to 51% by weight of the perfluoropolyether GALDEN® HT 55 and from 16 to 36% by weight of trans-1,2-dichioroethylene. Ternary compositions containing from 23 to 43% 1,1,1,3,3-pentafluorobutane, from 36 to 46% by weight of the perfluoropolyether GALDEN® HT 55 and from 21 to 31% by weight of trans-1,2-dichloroethylene are preferred. Ternary compositions containing from 29 to 37% 1,1,1,3,3-pentafluorobutane, from 39 to 43% by weight of the perfluoropolyether GALDEN® HT 55 and from 24 to 28% by weight of trans-1,2-dichloroethylene are particularly preferred. At a pressure of about 101.3 kPa, the ternary composition essentially consists of about 33% by weight of 1,1,1,3,3-pentafluorobutane, 41% by weight of the perfluoropolyether GALDEN® HT 55 and about 26% by weight of trans-1,2-dichloroethylene which constitutes a true azeotrope whose boiling point is about 32° C.

The alcohols that can be used in the compositions according to the invention may be linear, branched or cyclic and generally contain 1, 2, 3, 4, 5, 6, 7, 8, 9 or 10 carbon atoms. Alcohols containing 1, 2, 3, 4 or 5 carbon atoms are very suitable. Preferably, the alcohols contain 1, 2, 3 or 4 carbon atoms. Among alkanols, methanol, ethanol, n-propanol, isopropanol, n-butanol, isobutanol and tert-butanol are preferred. Methanol, ethanol, isopropanol and isobutanol give good results. Methanol and ethanol are most particularly preferred.

In a particular embodiment, the composition according to the invention comprises a butanol, in particular isobutanol. Compositions comprising a butanol are suitably used when incorporation of a surfactant into the composition according to the invention is desired.

The esters that can be used in the compositions according to the invention may be linear, branched or cyclic and generally contain 2, 3, 4, 5, 6, 7, 8, 9 or 10 carbon atoms. Esters containing 4, 5, 6, 7, 8 or 9 carbon atoms are very suitable. Preferably the esters are derived from a carboxylic acid containing at least 2 carbon atoms. Preferably, the esters are derived from an alkanol selected from the group consisting of methanol, ethanol, n-propanol, isopropanol, n-butanol, isobutanol and tert-butanol. Ethyl acetate, ethyl butyrate and ethyl caproate are very suitable.

The ketones that can be used in the compositions according to the invention may be linear, branched or cyclic and generally contain 3, 4, 5, 6, 7, 8, 9 or 10 carbon atoms. Ketones containing 3, 4, 5, 6, 7 or 8 carbon atoms are very suitable. Among ketones, acetone, 2-butanone, 2-pentanone, 3-pentanone, methyl isobutyl ketone, diisopropyl ketone, cyclohexanone and acetophenone are preferred. Methyl isobutyl ketone is particularly preferred.

The ethers that can be used in the compositions according to the invention may be linear, branched or cyclic and generally contain 2, 3, 4, 5, 6, 7, 8, 9 or 10 carbon atoms. Ethers containing 4, 5, 6, 7, 8 or 9 carbon atoms are very suitable. Among aliphatic or alicyclic ethers, diethyl ether, methyl isopropyl ether, diethylene glycol monomethyl ether, diethylene glycol dimethyl ether, tetrahydrofuran and 1,4-dioxane are preferred., The non-fluorinated organic solvent content in a composition according to the invention may be chosen according to the desired polarity and the desired flammability of the composition. In general, this content is at most 50% by weight. Often, it is at most 20% by weight. Preferably, it is at most 10% by weight. When a non-fluorinated organic solvent is present, its content is generally at least 1% by weight. It is preferably at least 2% by weight.

Among the compositions according to the invention furthermore containing at least a non-fluorinated organic solvent, those which comprise 1,1,1,3,3-pentafluorobutane and a perfluoropolyether in proportions at which they form an azeotrope or pseudo-azeotrope, such as compositions of 1,1,1,3,3-pentafluorobutane with GALDEN® HT 55 perfluoropolyether and/or GALDEN® HT 70 perfluoropolyether such as described above are particularly preferred. In fact, in this preferred embodiment, the composition of the vapour phase above a liquid composition according to the invention is generally close to the azeotrope of 1,1,1,3,3-pentafluorobutane with the perfluoropolyether, so that the vapour phase remains non-flammable also when a flammable non-fluorinated organic solvent is used.

In another aspect, the compositions according to the invention additionally contain an aqueous phase. An aqueous phase consisting essentially of water is preferred. It has been found that, surprisingly, the compositions according to the invention additionally containing an aqueous phase form a stable emulsion which does not break even after a long period of storage. Often, if a stable emulsion is desired, the composition comprises in addition a surfactant. In a preferred embodiment, the composition comprises
(a) a hydrofluoroalkane,
(b) a perfluoropolyether or a hydrofluoropolyether,
(c) at least one non fluorinated organic solvent,
(d) a surfactant and
(e) water.

A hydrocarbon and/or an alcanol, as described above, are preferred as the non-fluorinated organic solvent in this embodiment.

The compositions according to the invention are very suitable for applications as refrigerants, as heat-transfer fluids, as blowing agents for polymeric foams, as toner fixing agents, as drying solvents and as degreasing solvents.

The compositions according to the invention comprising at least one non-fluorinated organic solvent are particularly suitable for applications as drying or degreasing solvents.

A drying solvent is used, for example, in the electronic, electromechanical or possibly cosmetic industries when it is desired to remove water adsorbed on a solid surface of an article after an aqueous treatment. The aqueous treatment may consist, for example, of a cleaning operation possibly in the presence of a surfactant. A few surfactants that can be used in the compositions according to the invention are described, for example, in Ullmann's Encyclopedia of Industrial Chemistry, 5th edition, 1987, Vol. A8, pp. 338-350. Cationic, anionic, nonionic and amphoteric surfactants may be used. In general, after the aqueous treatment the article is immersed in a drying solvent in the boiling state comprising a surfactant, and then the surfactant adhering to the surface of the article is removed in a washing bath. The compositions according to the invention which furthermore contain a surfactant as described above are very suitable for the drying operation. The compositions according to the invention containing no surfactant are very suitable for the washing bath intended to remove the surfactant.

A degreasing solvent is used, for example in the electronic or electromechanical industry, to remove grease adsorbed in particular on metal parts machined using grease. In general, a part to be degreased is immersed in a degreasing solvent bath in the boiling state. Particularly suitable as degreasing solvents are compositions according to the invention comprising a highly polar non-fluorinated organic solvent, such as alkanols, in particular methanol, ethanol or isobutanol and/or those which comprise a chlorinated hydrocarbon.

A toner fixing agent is used to, fix toner particles to a medium. Toner particles generally comprise a polymer and a pigment. During electrophotographic printing, the particles are attracted to the electrostatic image printed on the medium by electrostatic forces. The toner fixing agent serves to soften the polymer, which consequently ensures permanent adhesion of the particles to the medium. Toner fixing agents are used in vapour form, the vapour generally being generated by drops of solvent vaporizing on, for example, a hot plate. The non-flammable compositions according to the invention having a high polymer solvent power are very suitable for this application.

The compositions according to the invention which are non-flammable according to the ISO 1523 standard may be advantageously used as a drying solvent in a drying machine or as a toner fixing agent in an industrial laser printer.

The compositions according to the invention are also very suitable as refrigerants, in particular as products to replace CFC-11 (trichlorofluoromethane) or as products to replace CFC-113 (1,1,2-trichlorotrifluoroethane), especially for applications with a turbocompressor. Turbocompressors are used most especially when it is desired to obtain high levels of refrigeration for air-conditioning plants for example or for the process industry. Information regarding refrigeration applications, heat-transfer fluids and refrigeration using a turbocompressor are contained, for example, in Ullmann's Encyclopedia of Industrial Chemistry, 5th edition, 1988, Vol. B3, pp. 19-2 to 19-39. Particularly suitable for this application are azeotropic or pseudo-azeotropic compositions essentially consisting of 1,1,1,3,3-pentafluorobutane and the perfluoropolyether GALDEN® HT55.

The invention also relates to the use of the compositions according to the invention as a blowing agent, in particular for polymeric foams. The compositions according to the invention are very suitable for the manufacture of polyurethane foams. The invention consequently also relates to a process for manufacturing polyurethane or modified polyurethane (polyisocyanurate) foams in which at least one isocyanate is made to react with at least one polyol in the presence of a composition according to the invention, at least one catalyst and other standard additives. Particularly suitable for this application are the compositions according to the invention comprising 1,1,1,3,3-pentafluorobutane and a hydrofluoropolyether.

The compositions according to the invention are also suitable for the manufacture of phenolic resins. Particularly suitable for this application are the compositions according to the invention comprising 1,1,1,3,3-pentafluorobutane and a hydrofluoropolyether.

The invention also relates to the use of a hydrofluoroalkane having a boiling point greater than or equal to 10° C. at 101.3 kPa for the manufacture of a coating composition intended to deposit a layer of material on a body.

It has been found that the hydrofluoroalkanes having a boiling point greater than or equal to 10° C. at 101.3 kPa, in particular 1,1,1,3,3-pentafluorobutane, are a suitable constituent of compositions that can be used for dissolving, dispersing or suspending inorganic or organic materials intended for deposition on a surface in the form of a layer.

The invention therefore also relates to a coating composition comprising a hydrofluoroalkane having a boiling point greater than or equal to 10° C. at 101.3 kPa and at least one material suitable to be deposited in layer form on a surface.

Examples of materials able to be contained in a coating composition according to the invention are chosen inter alia, from adhesives, colorants, inorganic compounds, lubricants, pigments, stabilizers, possibly pharmaceutical products, etc.

The coating composition may contain, for example, as material, a polymer. Polymers that can be used in the coating composition according to the invention may be chosen from, for example, fluoropolymers and acrylic polymers. Polytetrafluoroethylene (PTFE) is very suitable.

The coating compositions according to the invention containing a fluoropolymer are preferred. Specific examples of fluoropolymers are fluoropolymers which can be used as greases or lubricants. The coating compositions according to the invention are particularly useful to deposit a fluorinated grease onto a solid surface. Use of a coating composition comprising an azeotropic or pseudo-azeotropic composition according to-the invention as described above and a fluoropolymer as described herebefore is particularly preferred.

In a further embodiment, the coating composition according to the invention contains a silicone. The term silicone is understood to denote a siloxane polymer. A polyalkylsiloxane polymer is particularly suited.

The coating composition may also contain, as material, a metal salt or a metal complex. Metal oxides such as titanium oxide, magnesium oxide and iron oxide are very suitable.

Preferably, the coating composition according to the invention comprises a composition containing a hydrofluoroalkane and a perfluoropolyether or a hydrofluoropolyether as described above.

The content of material suitable to be deposited in layer form on a surface in the coating composition according to the invention is generally greater than or equal to 0.01% by weight. Often this content is greater than or equal to 0.1% by weight. Preferably, this content is greater than or equal to 0.2% by weight. The content of material suitable to be deposited in layer form on a surface in the coating composition according to the invention is generally less than or equal to 20% by weight. Often this content is less than or equal to 10% by weight. Preferably, this content is less than or equal to 5% by weight.

In a first aspect, the coating composition according to the invention is in the form of a suspension.

In a second aspect, the coating composition according to the invention is in the form of a dispersion.

In a third aspect, the coating composition according to the invention is in the form of a solution.

The invention also relates to a process for manufacturing a body comprising at least one surface on which a layer of material is deposited, in which process:
(a) the surface is brought into contact with the coating composition according to the invention; and
(b) the surface is subjected to a treatment allowing at least the hydrofluoroalkane to evaporate.

The treatment allowing at least the hydrofluoroalkane to evaporate may, for example, be a heat treatment or a pressure reduction.

In another embodiment, when the coating compositions comprises a composition according to the invention containing a hydrofluoroalkane and a perfluoropolyether or a hydrofluoropolyether, the surface is suitably subjected to a treatment allowing for evaporation at least of the composition according to the invention.

The example below is meant to illustrate the invention without, however, limiting it.

EXAMPLE 1

HFC-365mfc/GALDEN® HT 55 perfluoro-polyether azeotrope

To demonstrate the existence of azeotropic or pseudo-azeotropic compositions according to the invention containing 1,1,1,3,3-pentafluorobutane and the GALDEN® HT 55 perfluoropolyether, a glass apparatus consisting of a 50 ml boiling flask surmounted by a reflux condenser was used. The temperature of the liquid was measured by means of a thermometer immersed in the flask.

A precisely defined amount of pure 1,1,1,3,33-pentafluorobutane was heated at a known pressure until boiling and then accurately-weighed small amounts of GALDEN® HT 55 perfluoropolyether were gradually introduced into the flask by means of a syringe via a side nozzle.

The pseudo-azeotropic compositions were determined by measuring the variation in boiling point of the mixture as a function of its composition.

These measurements were carried out for mixtures containing 1,1,1,3,3-pentafluorobutane and increasing amounts of GALDEN® HT 55 perfluoropolyether at a pressure of 100.1±0.2 kPa.

The variation in the boiling point of the various compositions as a function of their HFC-365mfc and perfluoropolyether contents, expressed in % by weight, is shown in Table 1.

TABLE 1

| HFC-365mfc (wt %) | GALDEN ® HT 55 Perfluoropolyether (wt %) | Temperature (° C.) |
|---|---|---|
| 100.00% | 0.00% | 40.8 |
| 99.36% | 0.64% | 40.7 |
| 98.64% | 1.36% | 40.5 |
| 97.69% | 2.31% | 40.3 |
| 96.34% | 3.66% | 40 |
| 94.99% | 5.01% | 39.7 |
| 93.27% | 6.73% | 39.4 |
| 91.68% | 8.32% | 39.2 |
| 89.23% | 10.77% | 38.9 |
| 86.76% | 13.24% | 38.6 |
| 84.08% | 15.92% | 38.4 |
| 80.80% | 19.20% | 38.2 |
| 77.32% | 22.68% | 38 |
| 74.05% | 25.95% | 37.9 |
| 70.01% | 29.99% | 37.8 |
| 64.38% | 35.62% | 37.8 |
| 59.59% | 40.41% | 37.8 |
| 54.96% | 45.04% | 38.2 |
| 50.65% | 49.35% | 38.4 |
| 45.56% | 54.44% | 39.1 |

The azeotropic composition did not exhibit a flash point determined according to the ISO 1523 standard.

EXAMPLE 2

HFC-365mfc/GALDEN® HT 70 perfluoropolyether azeotrope 194 g of a mixture consisting 68% by weight of HFC-365mfc and 32% wt. of GALDEN® HT70 perfluoropolyether was distilled under atmospheric pressure (about 101.3 kPa) over a 10 cm Vigreux-column. A fraction corresponding to 11% wt. of the initial composition, having a boiling point of 38° C. was recovered from the distillation and its composition was analysed by gas chromatography. It was found that this fraction which consisted of 67% by weight of HFC-365mfc and 33 wt. of GALDEN® HT70 perfluoropolyether is a true minimum boiling point azeotrope. The vapours present above the recovered fraction could not be ignited by a burning match.

The flammability of a pseudo-azeotropic composition consisting of 77% by weight of HFC-365mfc and 23% wt. of GALDEN® HT70 perfluoropolyether was examined. The vapours present above the composition could not be ignited by a burning match.

EXAMPLE 3

Ternary azeotrope of HFC-365mfc/GALDEN® HT55 perfluoropolyether/trans-1,2-dichloroethylene 194 g of a mixture consisting of one third by weight of each of HFC-365mfc, GALDEN® HT55 perfluoropolyether and trans-1,2-dichloroethylene was distilled under atmospheric pressure (about 101.3 kPa) over a 10 cm Vigreux-column. A first fraction corresponding to 19% wt. of the initial composition, having a boiling point of 32° C. was recovered from the distillation and its composition was analysed by gas chromatography. The content of HFC-365mfc, GALDEN® HT55 perfluoropolyether and trans-1,2-dichloroethylene was 33% wt., 41 wt % and 26 wt % respectively. A further fraction corresponding to 17% wt. of the initial composition, having a boiling point of 32° C. was recovered after 59% of the initial composition had been distilled. The content of HFC-365mfc, GALDEN® HT55 perfluoropolyether and trans-1,2-dichloroethylene was 34% wt., 40 wt % and 26 wt % respectively. The recovered fractions were found to be a true minimum boiling point azeotrope. The vapours present above the recovered fractions could not be ignited by a burning match.

EXAMPLE 4

Emulsion

A composition according to, the invention comprising the azeotrope of HFC-365mfc and GALDEN® HT 55 perfluoropolyether was prepared. To this effect 20 g of an azeotropic composition of 65 wt % HFC-365mfc and 35 wt % GALDEN® HT55 were mixed with 5 g of SHELLSOL® D70 paraffinic hydrocarbon mixture (commercialised by Shell), 3 g of isobutanol and 5000 ppm wt. of NANSA® YS94 surfactant (commercialised by Rhodia). Finally 5 g of water was added and the mixture was agitated. A stable emulsion of water in the organic solvents was formed which did not break when stored for several weeks at room temperature. The vapours present above the recovered fractions could not be ignited by a burning match. The emulsion is useful for degreasing applications, especially for cold-degreasing optionally with ultrasound.

EXAMPLE 5

Degreasing Composition

A composition according to, the invention comprising the azeotrope of HFC-365mfc and GALDEN® HT 55 perfluoropolyether was prepared. To this effect 140 g of an azeotropic composition of 65 wt % HFC-365mfc and 35 wt % GALDEN® HT55 were mixed with 60 g of SHELLSOL® D70 paraffinic hydrocarbon mixture (commercialised by Shell). This blend gave a fine dispersion of hydrocarbon in the fluorinated compounds at the boiling point of the composition. A rectangular 2×10 cm carbon steel part covered with a film of 1 g of a standard grease used for metal cutting was immersed into the above composition at the boiling temperature of the composition under atmospheric pressure. The evolution of the degreasing process was followed by monitoring each minute. After 4 minutes more than 95% of the grease was removed. After 5 minutes 100% of the grease was removed.

EXAMPLE 6

Coating Composition

In a solvent composition according to the invention consisting of 36.5 wt. % HFC-365mfc, 24.0 wt % GALDEN® HT55 perfluoropolyether, 30.5 wt. % trans 1,2-dichloroethylene and 9 wt. % of ethanol, 1.5 wt % of MDX4-4159 silicone (dispersion 50% wt.)(commercialised by DOW CORNING) was dissolved. The composition was homogeneous and did not display any flash point determined according to standard ISO 1523. This composition can be used to deposit a layer of silicon material onto a solid surface.

The invention claimed is:

1. A composition comprising 1,1,1,3,3-pentafluorobutane and a perfluoropolyether of the formula (I),

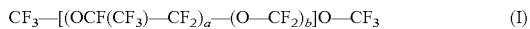

wherein a and b independently denote integers greater than 0, and said perfluoropolyether has a boiling point of about 57° C. at 101.3 kPa and an average molecular mass of about 340, in proportions for which they form an azeotrope or a pseudo-azeotrope, the said azeotrope or pseudo-azeotrope consisting of about 52% by weight to about 83% by weight of 1,1,1,3,3-pentafluorobutane and about 17% by weight to about 48% by weight of said perfluoropolyether of the formula (I) at a pressure of 100.1 kPa.

2. The azeotropic composition according to claim 1, consisting essentially of about 64.4% by weight of 1,1,1,3,3-pentafluorobutane and about 35.6% by weight of the perfluoropolyether of the formula (I) at a pressure of 100.1 kPa.

3. The composition according to claim 1, wherein the composition consists of 1,1,1,3,3-pentafluorobutane and a perfluoropolyether of the formula (I),

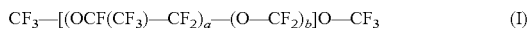

wherein a and b independently denote integers greater than 0, and said perfluoropolyether has a boiling point of about 57° C. at 101.3 kPa and an average molecular mass of about 340, in proportions for which they form an azeotrope or a pseudo-azeotrope, the said azeotrope or pseudo-azeotrope consisting of about 52% by weight to about 83% by weight of 1,1,1,3, 3-pentafluorobutane and about 17% by weight to about 48% by weight of said perfluoropolyether of the formula (I) at a pressure of 100.1 kpa.

4. The azeotropic composition according to claim 1, consisting of about 64.4% by weight of 1,1,1,3,3-pentafluorobutane and about 35.6% by weight of the perfluoropolyether of the formula (I) at a pressure of 100.1 kPa.

* * * * *